United States Patent
Balassanian et al.

(10) Patent No.: US 7,391,791 B2
(45) Date of Patent: Jun. 24, 2008

(54) METHOD AND SYSTEM FOR SYNCHRONIZATION OF CONTENT RENDERING

(75) Inventors: Edward Balassanian, Bellevue, WA (US); Scott W. Bradley, Kirkland, WA (US)

(73) Assignee: Implicit Networks, Inc., Seattle, WA (US)

( * ) Notice: Subject to any disclaimer, the term of this patent is extended or adjusted under 35 U.S.C. 154(b) by 836 days.

(21) Appl. No.: 10/322,335

(22) Filed: Dec. 17, 2002

(65) Prior Publication Data

US 2003/0221161 A1 Nov. 27, 2003

Related U.S. Application Data

(60) Provisional application No. 60/341,574, filed on Dec. 17, 2001.

(51) Int. Cl.
H04J 3/06 (2006.01)
(52) U.S. Cl. .................................................. 370/503
(58) Field of Classification Search ................. 370/431, 370/432, 464, 498, 503, 507–521; 709/219, 709/231–237, 248
See application file for complete search history.

(56) References Cited

U.S. PATENT DOCUMENTS

| | | | | |
|---|---|---|---|---|
| 5,333,299 A | * | 7/1994 | Koval et al. | 713/400 |
| 5,487,167 A | * | 1/1996 | Dinallo et al. | 715/500.1 |
| 5,553,222 A | * | 9/1996 | Milne et al. | 715/500.1 |
| 5,602,992 A | * | 2/1997 | Danneels | 709/248 |
| 5,623,483 A | * | 4/1997 | Agrawal et al. | 370/253 |
| 5,815,689 A | * | 9/1998 | Shaw et al. | 713/400 |
| 5,909,431 A | * | 6/1999 | Kuthyar et al. | 370/260 |
| 6,009,457 A | * | 12/1999 | Moller | 709/203 |
| 6,622,171 B2 | * | 9/2003 | Gupta et al. | 709/231 |
| 6,763,374 B1 | * | 7/2004 | Levi et al. | 709/217 |
| 6,934,759 B2 | * | 8/2005 | Hejna, Jr. | 709/231 |
| 6,985,966 B1 | * | 1/2006 | Gupta et al. | 709/248 |
| 7,096,271 B1 | * | 8/2006 | Omoigui et al. | 709/231 |

* cited by examiner

Primary Examiner—Dmitry Levitan
(74) Attorney, Agent, or Firm—Black Lowe & Graham PLLC

(57) ABSTRACT

A method and system for synchronizing the rendering of content at various rendering devices. Each rendering device has a device time and a rendering time. The synchronization system designates one of the rendering devices as a master rendering device and designates all other rendering devices as slave rendering devices. Each slave rendering device adjusts the rendering of its content to keep it in synchronization with the rendering of the content at the master rendering device. The master rendering device sends a message with its rendering time and corresponding device time to the slave rendering devices. Each slave rendering device, upon receiving the message from the master rendering device, determines whether it is synchronized with the master rendering time. If not, the slave rendering device adjusts the rendering of its content to compensate for the difference between the master rendering time and the slave rendering time.

27 Claims, 10 Drawing Sheets

Time Domain Table 300

| 301 Node id | 302 ST1 | 303 RT1 | 304 ST2 | 305 RT2 | 306 Diff |
|---|---|---|---|---|---|
| 307 101 | 2000 | 1010 | 1015 | 2025 | 1000 |
| 308 102 | 2000 | 2510 | 2600 | 2120 | -495 |

METHOD AND SYSTEM FOR SYNCHRONIZATION OF CONTENT RENDERING

CROSS REFERENCE TO RELATED APPLICATION

This application claims the benefit of U.S. Provisional Application No. 60/341,574 filed Dec. 17, 2001, which is incorporated herein by reference in its entirety.

TECHNICAL FIELD

The described technology relates to rendering of content at multiple rendering devices in a synchronized manner.

BACKGROUND

Multimedia presentations that are presented on different rendering devices (e.g., video display and stereo system) typically require that the different content of the presentation be rendered in a synchronized manner. For example, a multimedia presentation may include video, audio, and text content that should be rendered in a synchronized manner. The audio and text content may correspond to the dialogue of the video. Thus, the audio and text contents need to be rendered in a synchronized manner with the video content. Typically, the content of a multimedia presentation is stored at a single location, such as on a disk drive of a source device. To render the presentation, the source device retrieves each different type of content and sends it to the appropriate rendering device to effect the multimedia presentation. The source device then sends the content to the rendering devices in sufficient time so that the rendering devices can receive and render the content in a timely manner.

Various rendering devices, however, may have different time domains that make the rendering of the multimedia presentation in a synchronized manner difficult. For example, video and audio rendering devices may have system clocks that operate at slightly different frequencies. As a result, the video and audio content will gradually appear to the person viewing the presentation to be out of synchronization. The rendering of content in a synchronized manner is made even more difficult because some rendering devices may have multiple time domains. For example, an audio rendering device may have a system clock and a clock on a digital signal processing ("DSP") interface card. In such a case, the combination of clocks may result in the presentation becoming even more quickly out of synchronization.

It would be desirable to have the technique that would facilitate the rendering of the multimedia presentation in a synchronized manner.

BRIEF DESCRIPTION OF THE DRAWINGS

FIG. 3 illustrates a time domain table for a rendering device in one embodiment.

FIG. 6 is a flow diagram illustrating the processing of the send time domain message component in one embodiment.

DETAILED DESCRIPTION

Figure 1:
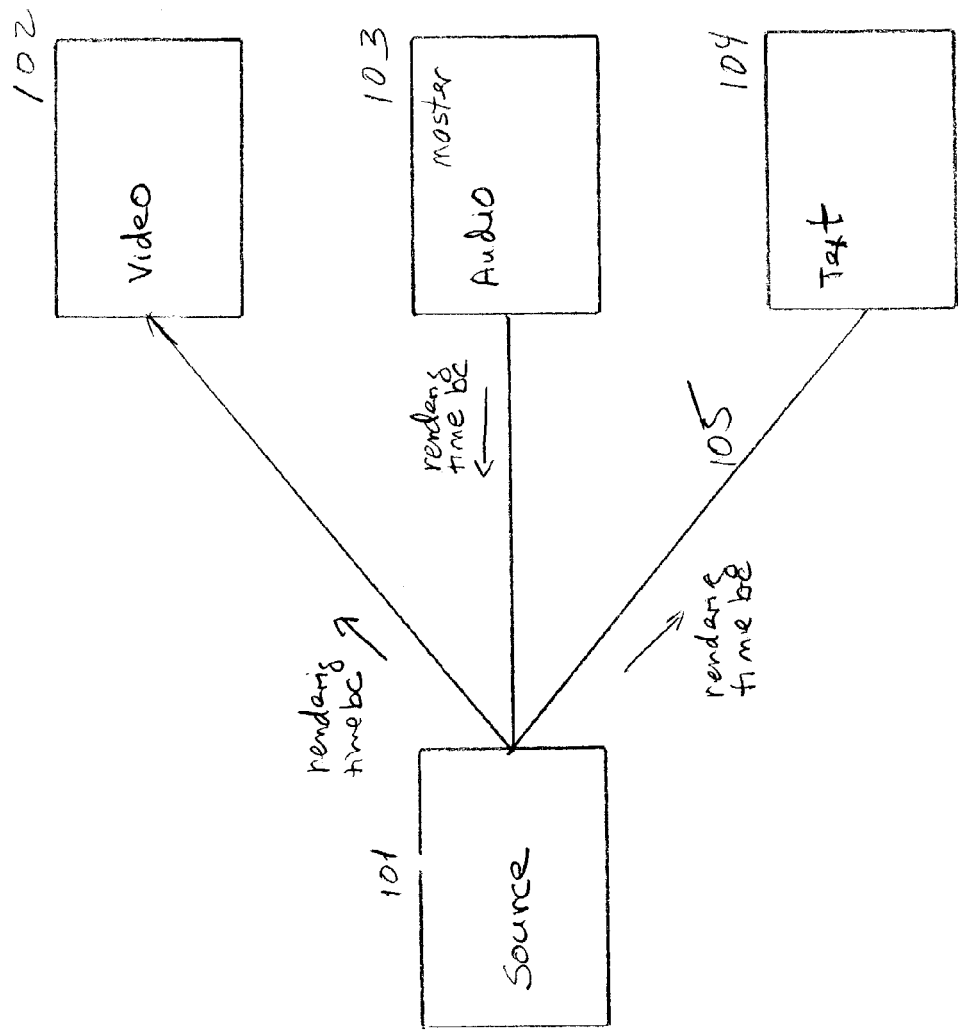
FIG. 1 is a block diagram illustrating synchronization of rendering devices in one embodiment.

A method and system for synchronizing the rendering of content at various rendering devices is provided. In one embodiment, each rendering device has a device time and a rendering time. The device time is the time as indicated by a designated clock (e.g., system clock) of the rendering device. The rendering time is the time represented by the amount of content that has been rendered by that rendering device. For example, if a rendering device is displaying 30 frames of video per second, then the rendering time will be 15 seconds after 450 frames are displayed. The rendering time of content at a rendering device has a "corresponding" device time, which is the device time at which the rendering time occurred. For example, the rendering time of 15 seconds may have a corresponding device time of 30 minutes and 15 seconds when the rendering device initialized 30 minutes before the start of rendering the video. To help ensure synchronization of rendering devices, the synchronization system designates one of the rendering devices as a master rendering device and designates all other rendering devices as slave rendering devices. Each slave rendering device adjusts the rendering of its content to keep it in synchronization with the rendering of the content at the master rendering device. The master rendering device sends a message with its rendering time and corresponding device time to the slave rendering devices. Each slave rendering device, upon receiving the message from the master rendering device, determines whether it is synchronized with the master rendering time. If not, the slave rendering device adjusts the rendering of its content to compensate for the difference between the master rendering time and the slave rendering time. A slave rendering device can determine the amount it is out of synchronization by comparing its slave rendering time at a certain slave device time to the master rendering time at that same device time. Alternatively, the amount can be determined by comparing its slave device time at a certain rendering time to the master device time at that same rendering time. In another embodiment, the synchronization system can define a default rendering time for the synchronization. In such a case, the master rendering device need only include its effective device time that corresponds to the default rendering time in the message that is sent to the slave rendering devices. For example, the default rendering time might be the rendering time of zero. In such a case, the master rendering device can subtract its current rendering time from its current device time to give its effective device time at rendering time zero. A slave rendering device, knowing the default rendering time, can determine whether it is synchronized and the variation in rendering time between the master rendering device and the slave rendering device.

In one embodiment, the synchronization system allows for two sources of content to be synchronized even though the rendering times of the sources are not themselves synchronized. For example, two separate sources may be video transmitted via satellite and audio transmitted via land telephone lines. If audio is being transmitted and then a few seconds later the corresponding video starts to be transmitted, then the rendering times of zero for the audio and video will not correspond to a synchronized state. For example, the video at the video rendering time of zero should be rendered at the same time as the audio with the audio rendering time of five is rendered. This difference in rendering times is referred to as source offset. In addition, the difference in the propagation delay resulting from the different transmission paths of the video and audio may be variable and thus contribute to a variation in synchronization that is variable and is not known in advance.

To account for this lack of synchronization, the synchronization system allows a user (e.g., the person viewing the content) to manually account for the variation. For example, if the video and audio are rendered via a personal computer, the synchronization system may display a dial or a slider on a user interface that the user can adjust to indicate the difference in the rendering times. If the video is rendered five seconds after the corresponding audio, then the user can indicate via the user interface that the offset is five seconds. In such a case, the synchronization system may use the offset to adjust the rendering time of the audio so that the audio associated with the adjusted audio rendering time should be rendered at the same time as the video content with the same video rendering time. The synchronization system could buffer the audio to account for the offset.

The synchronization system in one embodiment factors in the differences in the time domains of the various rendering devices when evaluating synchronization. The rendering devices exchange device time information so that the rendering devices can account for the differences in the time domains of the other rendering devices. Each rendering device may send to the other rendering devices a time domain message that includes its current device time (i.e., send time) along with the time it received the last time domain message (i.e., receive time) from each of the other rendering devices and the send time of that last time domain message. When a rendering device receives such a time domain message, it calculates the time differential between its time domain and the time domain of the sending rendering device. In one embodiment, the synchronization system calculates the time domain differential by combining the difference in send and receive times for the last messages sent to and received from another device in a way that helps factor out the transmission time of the messages. A slave rendering device can then use this time domain differential to convert the master device time to the time domain of the slave when synchronizing the rendering of content. In one embodiment, each rendering device broadcasts at various times its time domain message. The time domain message includes a received time for a message received for each of the other rendering devices. Each rendering device receives the broadcast time domain message. The receiving rendering device can then calculate its time domain differential with the broadcasting rendering device. In this way, time domain differentials can be determined on a peer-to-peer basis without the need for a master device to keep a master time and by broadcasting the time domain messages, rather then sending separate time domain messages for each pair of devices.

FIG. 1 is a block diagram illustrating synchronization of rendering devices in one embodiment. The source device 101 distributes the content of a presentation to the video rendering device 102, the audio rendering device 103, and the text rendering device 104 via communications link 105. The source device may have the multimedia presentation stored locally, for example, on a disk drive, may dynamically generate the multimedia presentation, may receive content of the multimedia presentation from other sources, and so on. A multimedia presentation is any presentation that includes different content that is to be rendered in a synchronized manner. For example, the content could be video and audio content for a virtual ride in a theme park along with motion content to control the ride. As another example, the presentation may include light content that controls the display of a laser to be synchronized with audio content. Also, the "synchronization" of content may be different for different rendering devices. For example, audio content may be sent to multiple audio rendering devices with the expectation that some of the audio rendering devices may delay rendering for a certain period (e.g., 10 milliseconds) to achieve a desired audio effect. In such a case, the rendering is considered synchronized when the delay equals that period. The synchronization system designates one of the rendering devices as the master rendering device. In this example, the audio rendering device 103 is designated as the master rendering device, and the video rendering device 102 and text rendering device 104 are designated as slave rendering devices. After the source starts sending the content to the rendering devices, the audio rendering device broadcasts a master rendering time message with its master device time and master rendering time to the slave rendering devices on a periodic basis. In this example, since the communications link is point-to-point from the source device, the audio rendering device sends the message to the source device, which in turn forwards the message to the slave rendering devices. Upon receiving the master rendering time message, the slave rendering devices convert the master device time to their own time domains and then calculate the difference between their slave rendering time and the master rendering time at a certain point in time. In one embodiment, the synchronization system uses a device time at a calculated start of sending as the point in time. The slave rendering devices then adjusts the rendering as appropriate to compensate for the difference. The rendering device adjusts the rendering of their content in ways that are appropriate for their content. For example, if the video rendering device was one second behind the master audio rendering device, then it might skip the display of every other frame for the next two seconds to "speed up" to the master audio rendering device. Alternately, if the video rendering device was one second ahead of the master audio rendering device, then the video rendering device might display each of the next 30 frames twice to "slow down" to the master audio rendering device.

Figure 2:
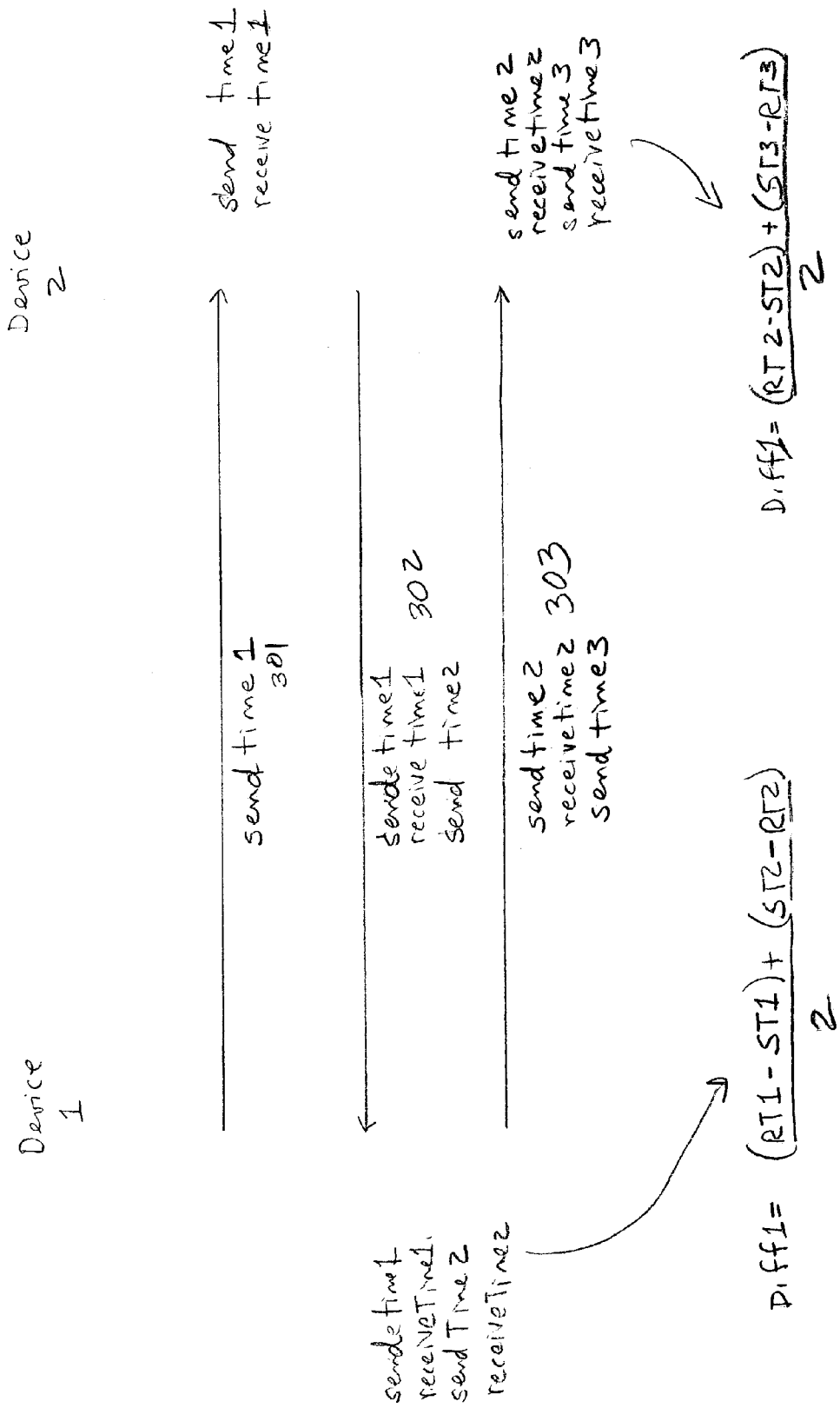
FIG. 2 is a diagram illustrating the calculation of the time domain differential between two devices.

FIG. 2 is a diagram illustrating the calculation of the time domain differential between two devices. Device 1 initially sends to device 2 a time domain message 201 that includes its current device time, referred to as "sendtime1." When device 2 receives the time domain message, it stores the sendtime1 along with the time it received the time domain message, referred to as "receivetime1." Device 2 then sends to device 1 a time domain message 202 that includes its device time, referred to as "sendtime2," along with sendtime1 and receivetime1. When device 1 receives the time domain message, it stores sendtime1, receivetime1, and sendtime2 along with its device time, referred to as "receivetime2." Device 1 now has enough information to calculate the time domain differential according to the following formula:

$$Diff=((RT1-ST1)+(ST2-RT2))/2$$

where Diff is the time domain differential, RT is receive time, and ST is send time. Device 1 then sends a time domain message 203 to device 2 that includes its device time, referred to as "sendtime3" along with sendtime2 and receivetime2. When device 2 receives the time domain message, it stores sendtime2, receivetime2, and sendtime3 along with its device time, referred to as "receivetime3." Device 2 now has enough information to calculate the time differential according to a similar formula.

This formula calculates the difference between the send time and the receive time for time domain messages between the two devices. If there was no variation in the time domains between the devices, then the send and receive times would reflect the communications link latency between sending and receiving the time domain messages. In one embodiment, the synchronization system assumes that the latency in transmitting a message from one device to another device is approximately the same as the latency in transmitting the message from the other device to the device. Thus, the synchronization system calculates the time domain difference by taking the average of the differences in the send and receive times of the messages. The receive time of the messages is represented by the following equations:

$$RT1 = ST1 + Diff + L$$

$$RT2 = ST2 - Diff + L$$

where Diff represents the time domain differential and L represents the latency of the communications link. These equations are equivalent to the following equations:

$$Diff = RT1 - ST1 - L$$

$$Diff = ST2 - RT2 + L$$

The average of these two equations is $$Diff = ((RT1 - ST1 - L) + (ST2 - RT2 + L))/2$$

The latency factors out of the equation to give the following equation:

$$Diff = ((RT1 - ST1) + (ST2 - RT2))/2$$

FIG. 3 illustrates a time domain table for a rendering device in one embodiment. The time domain table of a device includes a row for each other device to which the device is connected. For example, the audio rendering device 103 of FIG. 1 would have a row for the source device 101, the video rendering device 102, and the text rendering device 104. In this example, the time domain table includes a node identifier column 301, a sendtime1 column 302, a receivetime1 column 303, a sendtime2 column 304, a receivetime2 column 305, and a time domain differential column 306. A positive time domain differential indicates the number of time units that this device is ahead of the other device, and a negative time domain differential indicates the number of time units that this device is behind the other device. Thus, in this example, the device time of the audio rendering device 103 is ahead of the device time of the source device 101 by 1000 time units. In contrast, the device time of the audio rendering device 103 is behind the device time of the video rendering device 102 by 495 time units. One skilled in the art will appreciate the time units can be any units appropriate to the desired synchronization accuracy, such as milliseconds, microseconds, and so on. One skilled in the art will appreciate the time domain messages need not include the times set by the receiving device. For example, the time domain message 302 need not include sendtime1 since device 1 could have stored that time locally.

Figure 4:
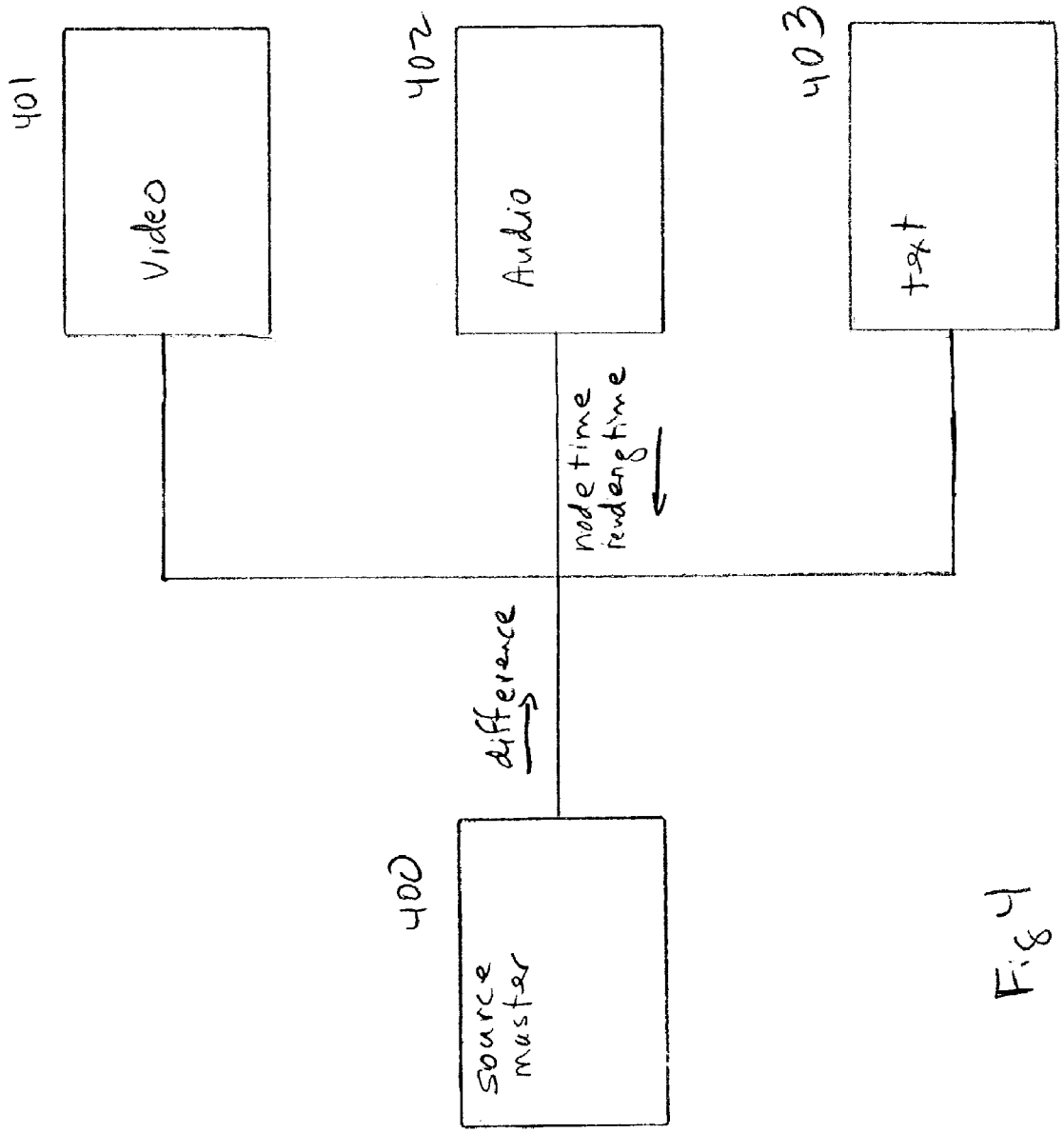
FIG. 4 illustrates a block diagram of another embodiment of the synchronization system.

FIG. 4 illustrates a block diagram of another embodiment of the synchronization system. In this example, the source device 400 performs the function of the master, and the video rendering device 401, the audio rendering device 402, and the text rendering device 403 are slaves. In particular, the source device, even though it does no rendering itself, may keep track of an idealized rendering time that may not correspond to the actual rendering time of any of the rendering devices. In such a situation, the master source device periodically sends a rendering time message that includes its device time along with the corresponding idealized rendering time to each of the rendering devices. The rendering devices can then adjust their rendering in the same manner as if the rendering time message is sent from a master rendering device. Alternatively, each rendering device can provide their device time and corresponding rendering time to the source device. The source device can then calculate the rendering time differential for each rendering device and provide that differential to the rendering devices to speed up or slow down their rendering as appropriate.

Figure 5:
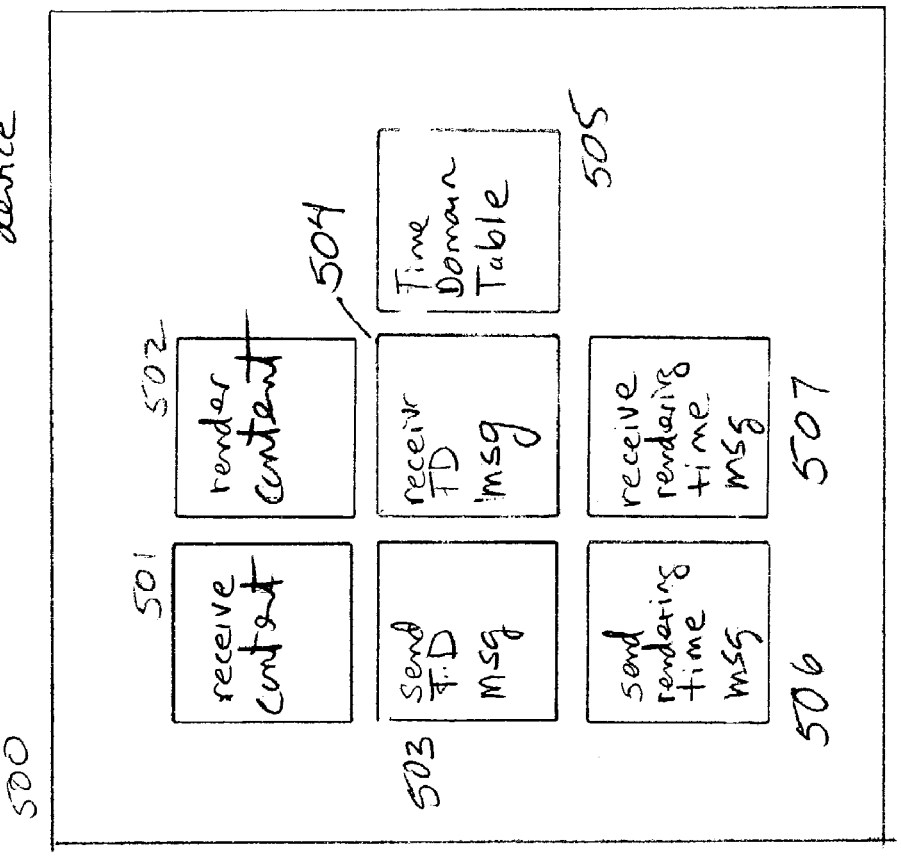
FIG. 5 is a block diagram illustrating components of a content rendering device in one embodiment.
Figure 4:
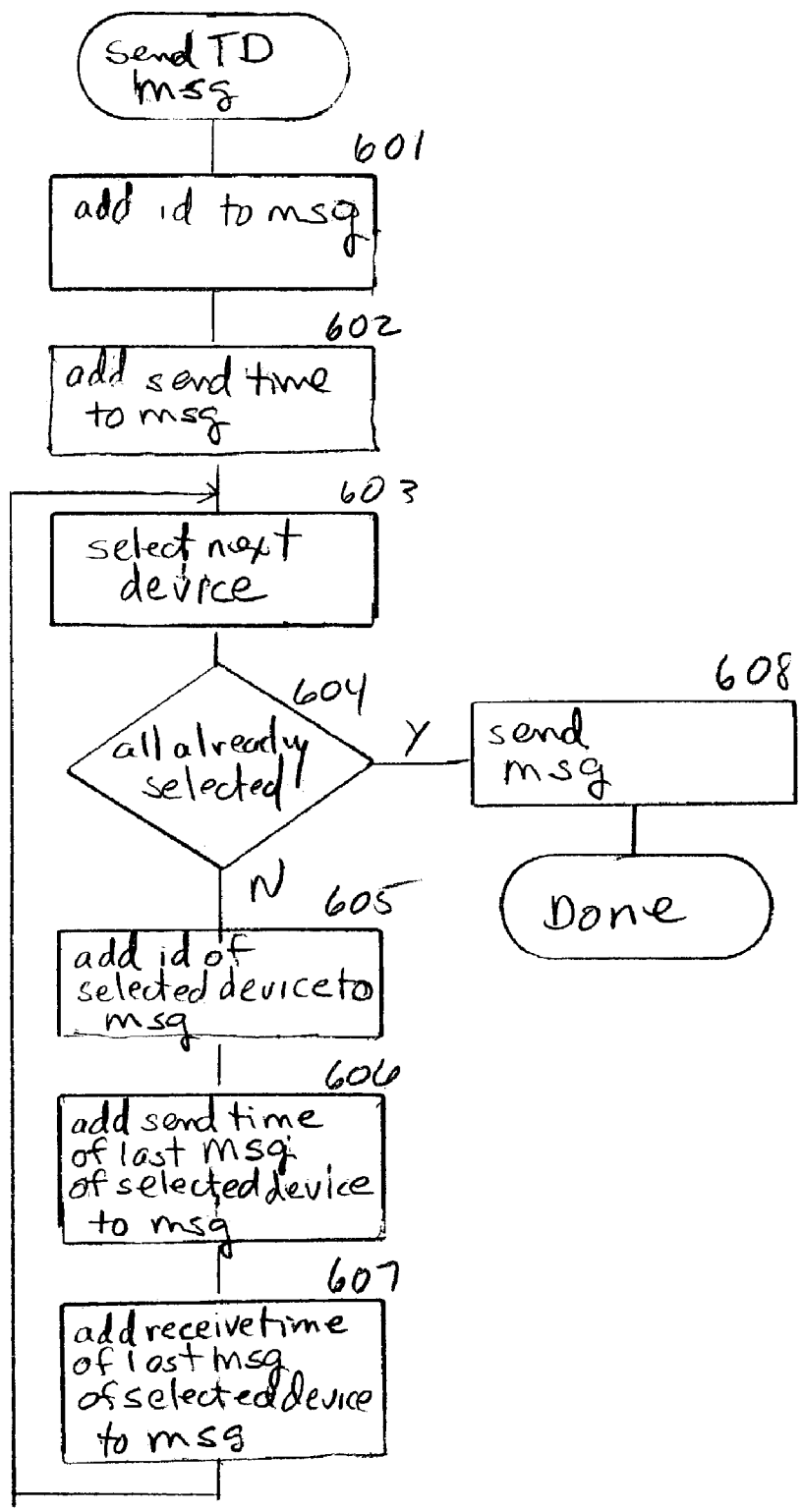

FIG. 5 is a block diagram illustrating components of a content rendering device in one embodiment. The content rendering device 500 includes a receive content component 501, a render content component 502, a send time domain message component 503, a receive time domain message component 504, a time domain table 505, a send rendering time message component 506, and a receive rendering time message component 507. The receive content component receives content from the source device and may store the content in a buffer for subsequent rendering. The rendering content component retrieves the buffered content and effects the rendering of the content. The send time domain message component sends time domain messages to the other devices. The send time domain message component may send the message upon occurrence of an event, such as when a timer expires, when a message is received, and so on. One skilled in the art will appreciate that the frequency of sending time domain messages can be adjusted to account for the anticipated drift between clocks of the rendering devices. The receive time domain message component receives the time domain messages sent by other devices and updates the time domain table as appropriate. The send rendering time message component is used when this content rendering device is a master rendering device to send a rendering time message to the other rendering devices. The receive rendering time message component receives the rendering time messages sent by the master device and calculates a rendering time differential that is used to adjust the rendering of the content. The devices may include a central processing unit, memory, input devices (e.g., keyboard and pointing devices), output devices (e.g., display devices), and storage devices (e.g., disk drives). The memory and storage devices are computer-readable media that may contain instructions that implement the synchronization system. In addition, data structures and message structures may be stored or transmitted via a data transmission medium, such as a signal on a communications link. Various communications links may be used, such as the Internet, a local area network, a wide area network, or a point-to-point dial-up connection.

FIG. 6 is a flow diagram illustrating the processing of the send time domain message component in one embodiment. In block 601, the component adds the identifier of this device to the time domain message. In block 602, the component adds the send time to the message. The send time is the current device time. In blocks 603-607, the component loops selecting each other device and adding times for that device to the time domain message then loops to block 603 to select the next device. In block 608, the component sends the time domain message to the other devices and then completes.

Figure 7:
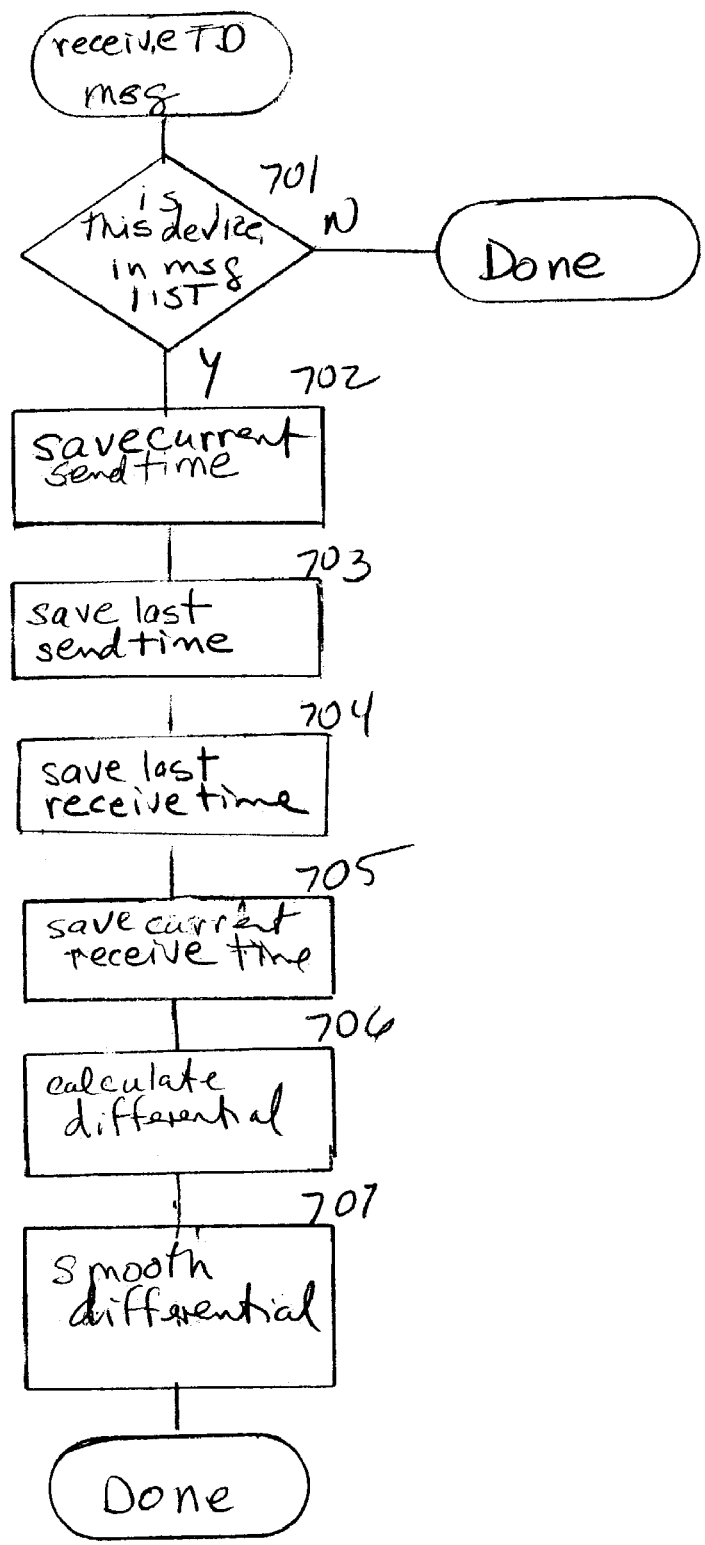
FIG. 7 is a flow diagram of the receive time domain message component in one embodiment.

FIG. 7 is a flow diagram of the receive time domain message component in one embodiment. In decision block 701, if the identifier of this device is in the list of device identifiers in the message, then the component continues at block 702, else the component completes. In block 702, the component retrieves the current send time from the message and saves it in the time domain table. In block 703, the component retrieves the last send time from the message and saves it in the time domain table. In block 704, the component retrieves the last receive time from the message and saves it in the time domain table. In block 705, the component retrieves the device time as the current receive time and saves it in the time domain table. The time values may be saved by storing them in the time domain table in the row associated with the device that sent the message. In block 706, the component calculates the time domain differential. In block 707, the component smoothes the time domain differential. The time domain differential can be smoothed using various techniques such as averaging the last several time domain differentials using a decaying function to limit the impact of the oldest time domain differentials. In one embodiment, the synchronization system saves the values of the last eight pairs of time domain differentials (i.e., ST2–RT2 and RT1–ST1) and uses the average of the minimum value of the set of eight larger differentials and the maximum value of the set of eight smaller differentials as the time domain differential. The component then completes.

Figure 8:
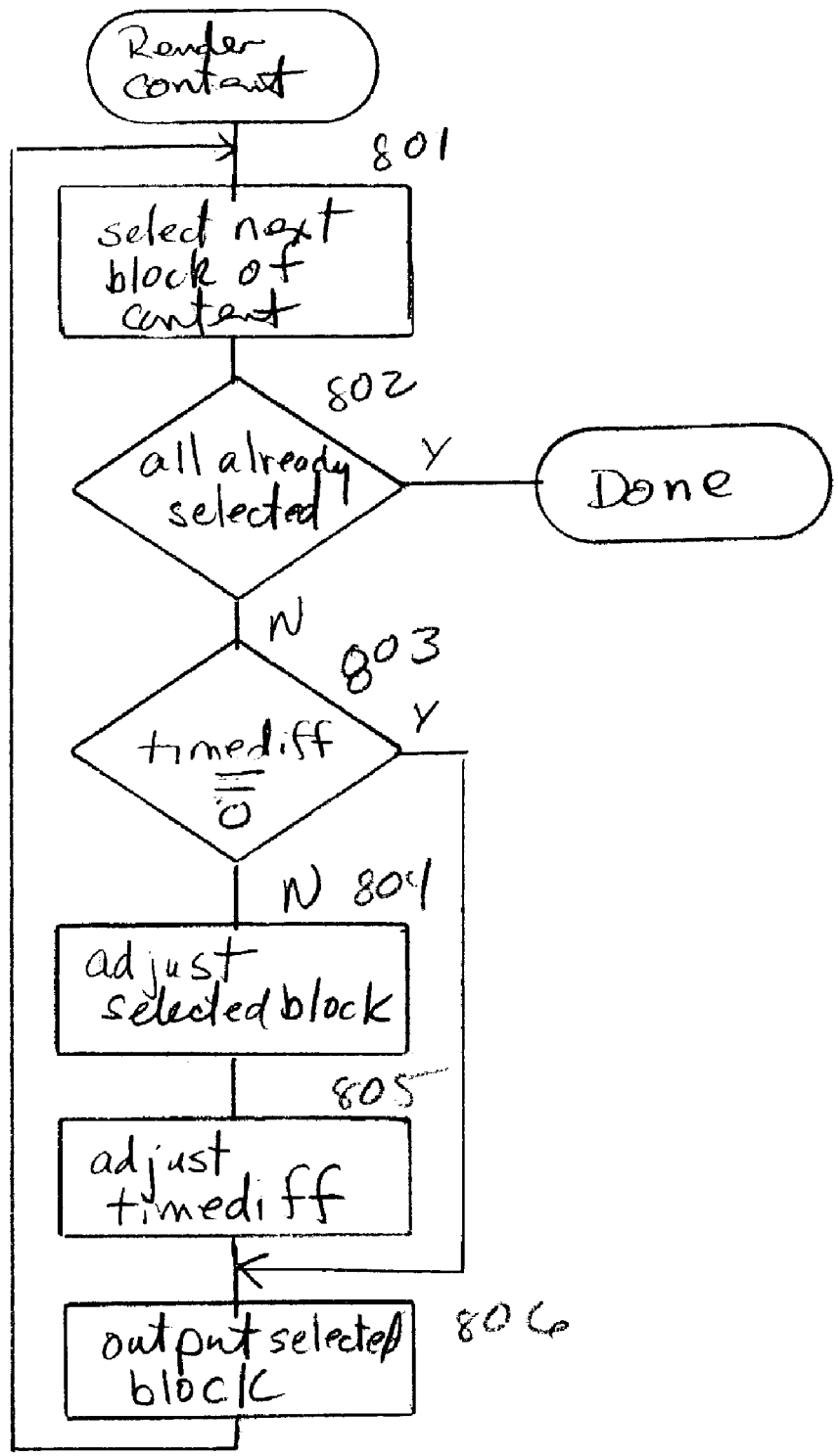
FIG. 8 is a flow diagram illustrating the render content component in one embodiment.

FIG. 8 is a flow diagram illustrating the render content component in one embodiment. In blocks 801-806, the component loops processing each block of content that is received from the source device. In block 801, the component selects the next block of content provided by the source device. The content may be buffered at this rendering device. In decision block 802, if all the blocks of content have already been selected, then the component completes, else the component continues at block 803. In decision block 803, if the rendering time differential is 0, then the component continues at block 806, else the component continues at block 804. The rendering time differential is calculated by the receive rendering time message component and adjusted by this component as the rendering of the content is adjusted. In block 804, the component adjusts the selected block to account for the rendering time differential. For example, if the content corresponds to video information, then the component may remove frames to effectively speed up the rendering or may duplicate frames to effectively slow down the rendering. In block 805, the component adjusts the rendering time differential to account for the adjustments to the selected block. For example, if the block corresponds to one second of video information and the adjustment was to duplicate every frame in the block, then the rendering time differential is adjusted by subtracting one second. The rendering time continues to reflect the amount of the content that has been effectively rendered. For example, if every frame is duplicated in a one second interval resulting in two seconds of adjusted content, the rendering time would only be increased by one second. In block 806, the component outputs the selected block, either adjusted or unadjusted to effect the rendering of that block of content. The component then loops to 801 to select the next block of content.

Figure 9:
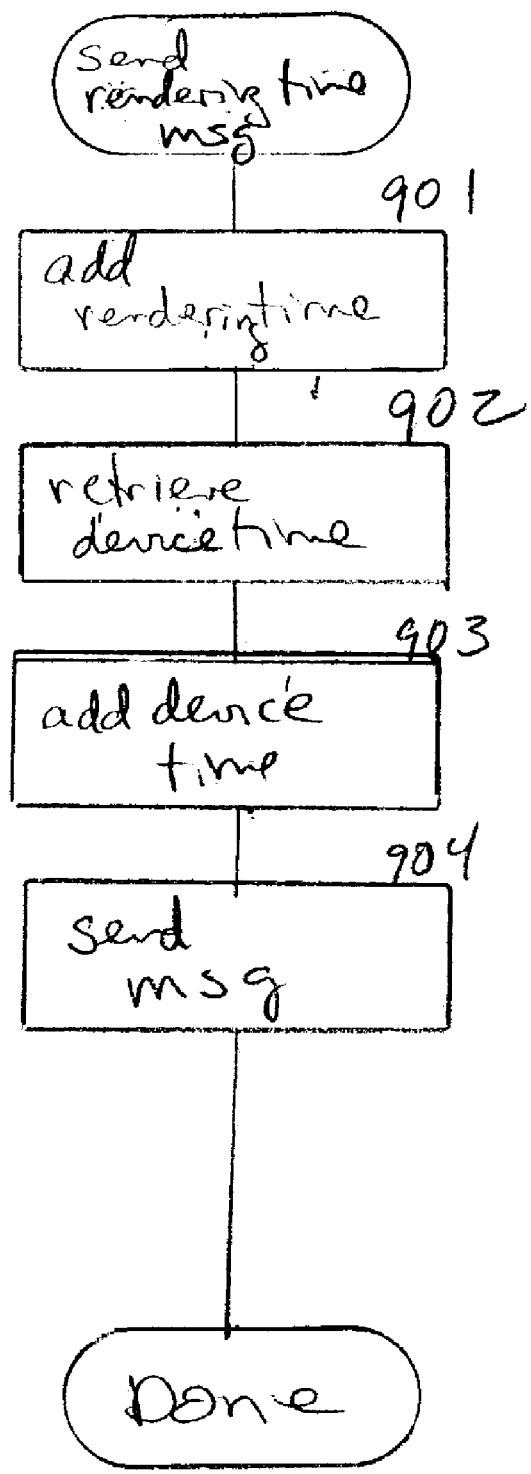
FIG. 9 is a flow diagram illustrating the process of the send rendering time message component in one embodiment.

FIG. 9 is a flow diagram illustrating the process of the send rendering time message component in one embodiment. The component can be executed upon the occurrence of various events, such as when a timer expires. In block 901, the component adds the rendering time of this master device to the message. In block 902, the component retrieves the device time for this master device. In block 903, the component adds the device time to the message. In block 904, the component then broadcasts the message to the other rendering devices and then completes.

Figure 10:
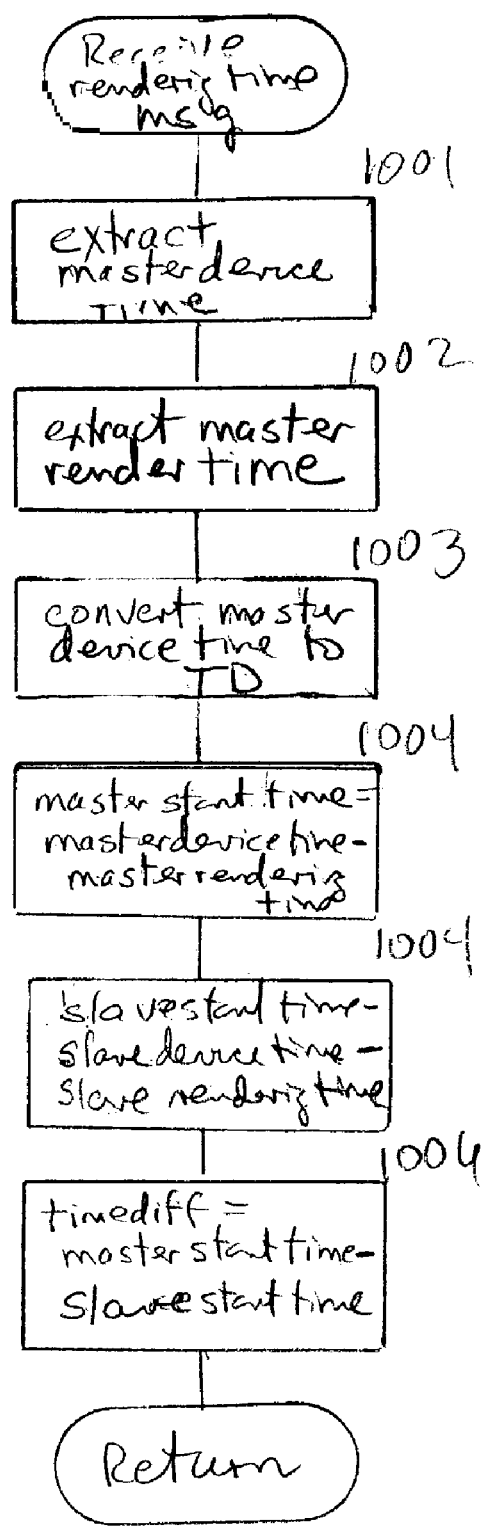
FIG. 10 is a block diagram illustrating the processing of the receive rendering time message component in one embodiment.

FIG. 10 is a block diagram illustrating the processing of the receive rendering time message component in one embodiment. In block 1001, the component extracts the master device time from the message. In block 1002, the component extracts the master rendering time from the message. In block 1003, the component converts the master device time to the time domain of this device. In block 1004, the component calculates the master start time by subtracting the master rendering time from the converted master device time. The master start time is in the time domain of this device and represents the time at which the master device effectively started rendering its content. In block 1005, the component calculates the slave start time of this device by subtracting the slave rendering time from the current slave device time. The slave start time indicates the time at which this slave device started rendering its content. In block 1006, the component calculates the rendering time differential by subtracting the slave start time from the master start time. The component then completes.

From the foregoing, it will be appreciated that specific embodiments of the invention have been described herein for purposes of illustration, but that various modifications may be made without deviating from the spirit and scope of the invention. The rendering devices can be components of the same physical device. For example, a DVD player may have a component that processes the video content and a separate component that processes the audio. The hardware and software of these components may result in a difference in rendering speed of the content, and thus the rendering can become out of synchronization over time. Accordingly, the invention is not limited except as by the appended claims.

We claim:

1. A method for synchronizing a rendering of a content provided by a source at one or more devices which are nodes of a network, the content having a rendering time, the method comprising:

designating one of the one or more devices a master device, the master device having a master device time and a master rendering time;

designating remaining devices among one of the one or more devices as at least one slave device, the at least one slave device having a slave device time and a slave rendering time;

receiving the content for rendering by the master and at least one slave device;

sending from the master device to the at least one slave device an indication of when the master device renders content corresponding to the master rendering time;

determining a master device time domain, a slave device time domain, and a source time domain;

determining whether a time domain differential exists between the master rendering time, the slave rendering time; and adjusting, based on the received indication, the rendering of the content at the at least one slave device within the slave device time domain and in proportion to the time domain differential when present to account for variation between when the master device and the at least one slave device to render content that should be rendered at the same time.

2. The method of claim 1 wherein the indication sent from the master device to the at least one slave device includes the master device time at which the master device renders content corresponding to the master rendering time.

3. The method of claim 2 wherein the indication sent from the master device to the at least one slave device includes the master rendering time.

4. The method of claim 2 wherein the master rendering time is a default rendering time.

5. The method of claim 2 wherein the master rendering time is time zero.

6. The method of claim 1 wherein the determining the time domains of the master device, the slave device, and the source includes determining the time domains relative to an other device by sending the send and receive times of at least one of the master device, the slave device, and the source to the other device.

7. The method of claim 6 wherein determining the time domain differential includes:
   calculating a first difference between the master receive and master send times;
   calculating a second difference between the slave receive and the slave send times;
   adding the first and second differences to yield a difference sum; and
   halving the difference sum.

8. The method of claim 7 wherein adjusting the rendering of the content includes:
   conforming the slave rendering time to the master device rendering time so that the master device time and the at least one slave device operate in the same time domain; and
   deducting or adding the time domain differential to the same time domain.

9. The method of claim 1 wherein the sending of the indication from the master device to the slave devices occurs at various times so that the at least one slave device can adjust the rendering of the content as appropriate.

10. The method of claim 1 wherein the adjusting accounts for variations in the time domain of the master device and the at least one slave device.

11. The method of claim 1 wherein the content is sent from a single source to the master device and the at least one slave device.

12. The method of claim 1 wherein the content is sent from different sources to the master device and the at least one slave device.

13. The method of claim 12 including receiving a rendering time adjustment that indicates a difference in the master rendering time and the slave rendering time of content that is to be synchronized.

14. The method of claim 13 wherein a user specifies the rendering time adjustment.

15. The method of claim 14 wherein the user specifies the rendering time adjustment by indicating the amount of time the master device and the slave device are out of synchronization.

16. A method for synchronizing rendering of content at devices which are nodes of network, each device having a device time and a rendering time, the device time of a device being in a time domain of the device, the method comprising:
   designating one of the devices as a master device having a master rendering time and the one or more slave devices having a slave rendering time;
   sending to each device content to be rendered at that device synchronized with the content sent to the other devices;
   sending from the master device to the one or more slave devices a master device time corresponding to the master rendering time of the master device; and upon receiving the sent master device time at the one or more slave devices,
   exchanging time domain information between the master and one or more slave devices;
   determining at least one time domain differential between the master rendering time and the slave rendering time between the master device and the one or more slave devices;
   adjusting the rendering of the content at the one or more slave devices to account for a difference in the slave rendering time and the master rendering time calculated based on the master device time adjusted for a difference in time domains of the one or more slave devices and the master device.

17. The method of claim 16 wherein the at least one time domain differential between the slave rendering time and the master rendering time is calculated by:
   converting the master device time to a time frame of the slave device;
   calculating a master start time for the master device from the converted master device time and the master rendering time;
   calculating a slave start time for the slave device from the slave device time and the slave rendering time; and
   calculating the difference between the slave start time and the master start time.

18. The method of claim 16 wherein sending from the master device to the one or more slave devices includes the master device time and the master rendering time to occur at various times so that the one or more slave devices can adjust the rendering of the content as appropriate.

19. The method of claim 16 wherein the content is sent from different sources to the master device and the slave devices.

20. The method of claim 19 including receiving a rendering time adjustment that indicates the difference in a master rendering time and the slave rendering time of content that is to be synchronized.

21. The method of claim 20 wherein a user specifies the rendering time adjustment.

22. The method of claim 21 wherein the user specifies the rendering time adjustment by indicating the amount of time the master device and the slave device are out of synchronization.

23. A method for synchronizing rendering of content at devices which are nodes of a network, each device having a device time and a rendering time, the device time of a device being in a time domain of the device, the method comprising:
   designating one of the devices as a master device having a master rendering time and the one or more slave devices having a slave rendering time; and for each slave device,
   exchanging time domain information between the master and one or more slave devices;
   calculating a time domain difference between the master rendering time of the master device and the slave rendering time of the slave device based on a master device time adjusted for a difference in time domains of the slave device and the master device; and
   rendering content at the slave device to account for the calculated time domain difference.

24. The method of claim 23 including sending a master device time and the master rendering time to each slave device for use in calculating the time domain difference.

25. The method of claim 24 wherein the master device sends the master device time and the master rendering time to the slave devices.

26. The method of claim 24 wherein each slave device converts the master device time to its time domain.

27. The method of claim 24 wherein the master device converts the master device time to the time domain of a slave device before sending it.

* * * * *